US008423546B2

(12) United States Patent
Gherman et al.

(10) Patent No.: US 8,423,546 B2
(45) Date of Patent: Apr. 16, 2013

(54) IDENTIFYING KEY PHRASES WITHIN DOCUMENTS

(75) Inventors: Sorin Gherman, Kirkland, WA (US); Kunal Mukerjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 79 days.

(21) Appl. No.: 12/959,840

(22) Filed: Dec. 3, 2010

(65) Prior Publication Data

US 2012/0143860 A1 Jun. 7, 2012

(51) Int. Cl.
*G06F 7/00* (2006.01)
*G06F 17/30* (2006.01)

(52) U.S. Cl.
USPC .......................................................... 707/736

(58) Field of Classification Search ................... 707/736
See application file for complete search history.

(56) References Cited

U.S. PATENT DOCUMENTS

| 6,473,753 | B1 * | 10/2002 | Katariya et al. ....................... 1/1 |
| 7,269,546 | B2 | 9/2007 | Stensmo |
| 8,135,728 | B2 | 3/2012 | Yih |
| 2006/0218115 | A1 | 9/2006 | Goodman |
| 2007/0112764 | A1 | 5/2007 | Yih |
| 2007/0185857 | A1 | 8/2007 | Kienzle |
| 2008/0172409 | A1 | 7/2008 | Botros |
| 2009/0112844 | A1 * | 4/2009 | Oro .................................. 707/5 |
| 2009/0240498 | A1 | 9/2009 | Yih |
| 2009/0287676 | A1 * | 11/2009 | Dasdan ............................ 707/5 |
| 2009/0319508 | A1 | 12/2009 | Yih |
| 2010/0005083 | A1 | 1/2010 | Morgana |

OTHER PUBLICATIONS

Hooker, John Lee, "A Teaser . . . Why is SharePoint So Popular?" Feb. 21, 2009, 19 pages.
Carpdeus, "Full Text Search, an option or two", Oct. 17, 2008, 2 pages.
WEASK.US, "List index value retrieval", Based on information and belief available, at least as early as Sep. 7, 2010, 13 pages.
Ahern, Shane, et al., "World Explorer: Visualizing Aggregate Data From Unstructured TExt in Geo-Referenced Collections", Jun. 2007, 10 pages.

* cited by examiner

*Primary Examiner* — James Trujillo
*Assistant Examiner* — Jeffrey Chang
(74) *Attorney, Agent, or Firm* — Workman Nydegger

(57) ABSTRACT

The present invention extends to methods, systems, and computer program products for identifying key phrases within documents. Embodiments of the invention include using a tag index to determine what a document primarily relates to. For example, an integrated data flow and extract-transform-load pipeline, crawls, parses and word breaks large corpuses of documents in database tables. Documents can be broken into tuples. The tuples can be sent to a heuristically based algorithm that uses statistical language models and weight+cross-entropy threshold functions to summarize the document into its "top N" most statistically significant phrases. Accordingly, embodiments of the invention scale efficiently (e.g., linearly) and (potentially large numbers of) documents can be characterized by salient and relevant key phrases (tags).

16 Claims, 4 Drawing Sheets

IDENTIFYING KEY PHRASES WITHIN DOCUMENTS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

For many organizations, documents easily comprise the largest information assets by volume. As such, characterizing a document by its salient features, such as, for example, its key words and phrases, is an important piece of functionality.

One technique for characterizing documents includes using full text search solutions that mine documents into full text inverted indices. Another technique for characterizing documents mines document level semantics (e.g., to identify similarities between documents). Proper implementation of either of these two techniques can require heavy investments in both computer hardware and personnel resources.

Further, document parsing, mining, etc. operations are often replicated across these two techniques. As such, an end user pays additional costs by having to invest in (perhaps as much as double) resources to reap the benefits of both search and semantic insight over their documents. Additionally, many more complex document mining techniques require integrating disparate systems together and lead to further costs in order to satisfy an organization's document processing needs.

BRIEF SUMMARY

The present invention extends to methods, systems, and computer program products for identifying key phrases in documents. In some embodiments, a document is accessed. The frequency of occurrence of a plurality of different textual phrases within the document is calculated. Each textual phrase includes one or more individual words of a specified language. A language model for the specified language is accessed. The language model defines expected frequencies of occurrence at least for individual words of the specified language.

For each textual phrase in the plurality of different textual phrases a cross-entropy value is computed for the textual phrase. The cross-entropy value is computed from the frequency of occurrence of the textual phrase within the document and the frequency of occurrence of the textual phrase within the specified language. A specified number of statistically significant textual phrases from within the document are selected based on the computed cross-entropy values. A key phrase data structure is populated a with data representative of each of the selected specified number of statistically significant textual phrases.

In other embodiments, a document containing a plurality of textual phrases is accessed. For each textual phrase in the plurality of textual phrases contained the document, a location list is generated for the textual phrase. The location list indicates one or more locations of the textual phrase within the document. For each textual phrase in the plurality of textual phrases contained in the document, a score is assigned to the textual phrase. The score is based on the contents of the location list for the textual phrase relative to the occurrence of the textural phrase in a training set of data.

The plurality of textual phrases is ranked according to the assigned scores. A subset of the plurality of textual phrases is selected from within the document based on the rankings. A key phrase data structure is populated from the selected subset of the plurality of textual phrases.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
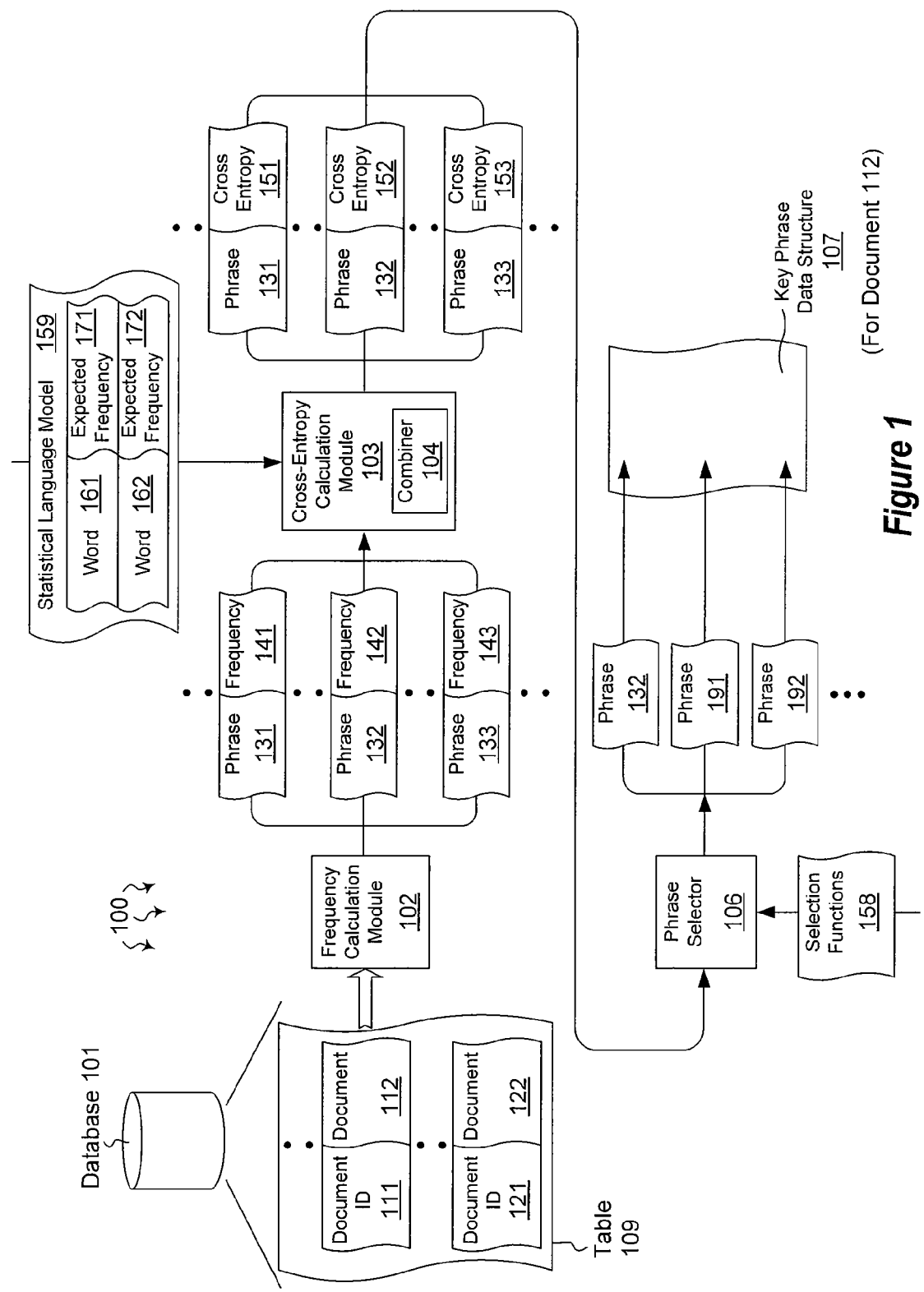
FIG. 1 illustrates an example computer architecture that facilitates identifying key phrases within documents.

The present invention extends to methods, systems, and computer program products for identifying key phrases in documents. A document is accessed. The frequency of occurrence of a plurality of different textual phrases within the document is calculated. Each textual phrase includes one or more individual words of a specified language. A language model for the specified language is accessed. The language model defines expected frequencies of occurrence at least for individual words of the specified language.

For each textual phrase in the plurality of different textual phrases a cross-entropy value is computed for the textual phrase. The cross-entropy value is computed from the frequency of occurrence of the textual phrase within the document and the frequency of occurrence of the textual phrase within the specified language. A specified number of statistically significant textual phrases from within the document are selected based on the computed cross-entropy values. A key phrase data structure is populated a with data representative of each of the selected specified number of statistically significant textual phrases.

In other embodiments, a document containing a plurality of textual phrases is accessed. For each textual phrase in the plurality of textual phrases contained the document, a location list is generated for the textual phrase. The location list indicates one or more locations of the textual phrase within the document. For each textual phrase in the plurality of textual phrases contained the document, a score is assigned to the textual phrase. The score is based on the contents of the location list for the textual phrase relative to the occurrence of the textural phrase in a training set of data.

The plurality of textual phrases is ranked according to the assigned scores. A subset of the plurality of textual phrases is selected from within the document based on the rankings. A key phrase data structure is populated from the selected subset of the plurality of textual phrases.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In general, an integrated data flow and extract-transform-load pipeline, crawls, parses and word breaks large corpuses of documents in database tables. Documents can be broken into tuples. In some embodiments, the tuples are of the format {phrase, frequency}. A phrase can include one or more words and the frequency is the frequency of occurrence within a document. The tuples can be sent to a heuristically based algorithm that uses statistical language models and weight+cross-entropy threshold functions to summarize the document into its "top N" most statistically significant phrases.

Alternately, tuples can be of the format including {phrase, location list}. The location list lists the locations of the phrase within a document. The tuples are sent to a Keyword Extraction Algorithm ("KEX") to compute, potentially with a higher quality (e.g. less noisy phrases), a set of textually relevant tags. Accordingly, documents can be characterized by salient and relevant key phrases (tags).

When a plurality of documents is being processed, each tuple can also include a document ID.

FIG. 1 illustrates an example computer architecture 100 that facilitates identifying key phrases within documents. Referring to FIG. 1, computer architecture 100 includes database 101, frequency calculation module 102, cross-entropy calculation module 103, phrase selector 106, and key phrase data structure 107. Each of the depicted computer systems is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Database 101 can be virtually any type of database (e.g., a Structured Query Language ("SQL") database or other relational database). As depicted, database 101 can contain one or more tables including table 109. Each table in database 101 can include one or more rows and one or more columns used to organize data, such as, for example, documents. For example, table 109 includes a plurality of documents including documents 112 and 122. Each document can be identified by a corresponding document ID. For example, document ID 111 can identify document 112, document ID 121 can identify document 122, etc.

Frequency calculation module 102 is configured to calculate the frequency of occurrence of a textual phrase within a document. Frequency calculation module 102 can receive a document as input. From the document, frequency calculation module 102 can calculate the frequency with which one or more textual phrases occur in the document. A textual phrase can include one or more words of a specified language. Frequency calculation module 102 can output a list of phrases and corresponding frequencies for a document.

In general, cross-entropy calculation module 103 is configured to calculate a cross-entropy between phrases in a specified document and the same phrases in a corresponding language module. Cross-entropy calculation module 103 can receive a list of one or more phrases and corresponding frequencies of occurrence for a document. Cross-entropy calculation module 103 can also receive a statistical language model. The statistical language model can include a plurality of words (or phrases) of a specified language and can define an expected frequency of occurrence for each of the plurality of words (or phrases) in the language.

Cross-entropy can measure the "amount of surprise" in the frequency of occurrence of a phrase in a specified document relative the frequency of occurrence of the phrase in the language model. For example, a particular phrase can occur with more or less frequency in a specified document as compared to the language model. Thus, cross-entropy calculation module 103 can be configured to calculate the cross-entropy between the frequency of occurrence of a phrase in a specified document and the frequency of occurrence of the phrase in a language module.

In some embodiments, expected frequencies of occurrence represent how often a word (or phrase) generally occurs within the specific language. In other embodiments, expected frequencies of occurrence are adjusted for particular document domains, such as, for example, legal documents, medical documents, engineering documents, sports related documents, financial documents, etc.

When appropriate, combiner 104 can combine one or more words from a language model into a phrase contained in a document. For example, combiner 104 can combine the words 'annual' and 'budget' into "annual budget". Combiner 104 can also compute a representative expected frequency for a phrase from expected frequencies for individual words included in the phrase. For example, combiner 104 can compute an expected frequency for "annual budget" from an expected frequency for 'annual' and an expected frequency for 'budget'. Combiner 104 can include an algorithm for inferring (e.g., interpolating, extrapolating, etc.) an expected frequency for a phrase from a plurality of frequencies for individual words.

Cross-entropy calculation module 103 can output a list of one more phrases and corresponding cross entropies.

Phrase selection module 106 is configured to select phrases for inclusion in a key phrase data structure for a document. Phrase selection module 106 can receive a list of one or more phrases and corresponding cross entropies. Phrase selection module 106 can also receive one or selection functions. Phrase selection module 106 can apply the selection functions to the cross entropies to select a subset of phrases for inclusion in the key phrase data structure for the document. Selection functions can include weighting functions and/or threshold functions. Selected phrases can be copied to the key phrase data structure for the document.

Figure 2:
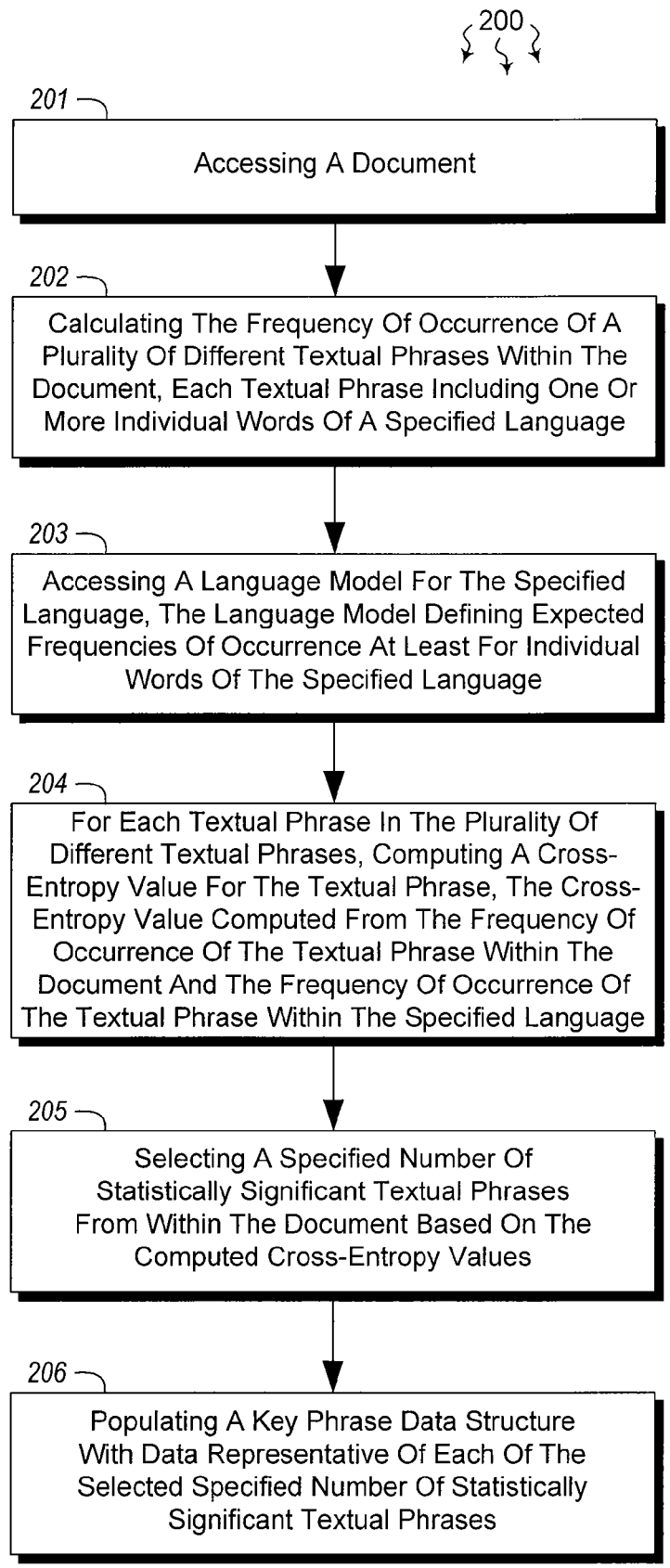
FIG. 2 illustrates a flow chart of an example method for identifying key phrases within documents.

FIG. 2 illustrates a flow chart of an example method 200 for identifying key phrases within documents. Method 200 will be described with respect to the components and data in computer architecture 200.

Method 200 includes an act of accessing a document (act 201). For example, frequency calculation module 102 can access document 112. Method 200 includes an act of calculating the frequency of occurrence of a plurality of different textual phrases within the document, each textual phrase including one or more individual words of a specified language (act 202). For example, frequency calculation module 102 can calculate the frequency of occurrence of a plurality of textual phrases, such as, for example, phrases 131, 132, and 133, within document 112. Each textual phrase in document 112 can include one or more individual words of a specified language (e.g., English, Japanese, Chinese, languages of India, etc.).

A frequency for a phrase can represent how often a phrase occurs in document 112. For example, frequency 141 represents how often phrase 131 occurs in document 112, frequency 142 represents how often phrase 132 occurs in document 112, frequency 143 represents how often phrase 133 occurs in document 112, etc. Frequency calculation module 102 can calculate frequencies for other additional phrases within document 112. Frequency calculation module 102 can send the phrases and corresponding frequencies to cross-entropy calculation module 103. Cross-entropy calculation module 103 can receive the phrases and corresponding frequencies from frequency calculation module 102.

Method 200 includes an act of accessing a language model for the specified language, the language model defining expected frequencies of occurrence at least for individual words of the specified language (act 203). For example, cross-entropy calculation module can access statistical language model 159. Statistical language model 159 can define expected frequencies of occurrence for words of the language of document 112. For example, word 161 has expected frequency 171, word 162 has expected frequency 172, etc.

For each textual phrase in the plurality of different textual phrases, method 200 includes an act of computing a cross-entropy value for the textual phrase, the cross-entropy value computed from the frequency of occurrence of the textual phrase within the document and the frequency of occurrence of the textual phrase within the specified language (act 204). For example, cross-entropy calculation module 103 can compute a cross-entropy value for phrases from document 112, such as, for example, phrases 131, 132, 133, etc. Cross-entropy for phrases 131, 132, 133, etc., can be computed from frequencies 141, 142, 143, etc., and expected frequencies 171, 172, etc. For phrases that occur more frequently than expected, cross-entropy can be increased. On the other hand, for phrases that occur less frequently than expected, cross-entropy can be decreased.

When appropriate, combiner 104 can compute an expected frequency for a phrase from expected frequencies for one or more words included in the phrase.

In some embodiments, cross entropy is computed in accordance with the following pseudo code example (where an ngram represents a phrase):

```
languageModel = SelectLanguageModel(document)
candidates = empty topN priority queue;
foreach((ngram, locations) in DNI[document])
{
    score = ComputeCrossEntropy(
            document.GetSize( ),
            locations.Length, // actual ngram frequency in current document
            languageModel.GetLogProb(ngram) // expected ngram logprob from
language model
        );
    candidates.Add(ngram, score);
}
wherein
ComputeCrossEntropy(numWordsInDocument, numOccurences, logprob)
{
    // we reward repeated occurrences; BoostMultiplier = 20
    if (numOccurences > 1): numOccurences *= BoostMultiplier
    observedLogprob = Log10(numOccurences/numWordsInDocument)
    rawWeight = logprob/observedLogprob
    // smoothen the result to better cover the 0-1 range.
    result = (((maxWeightCommonRange-minWeightCommonRange)/(
            maxLogprobCommonRange-minLogprobCommonRange)) * (rawWeight-
            minLogprobCommonRange)) + minWeightCommonRange
    if result < 0: result = 0
    if result > 1: result = 1
    return result
}
```

In some embodiments, values for one or more of minWeightCommonRange, maxWeightCommonRange are selected to linearize results. For example, minWeightCommonRange (=0.1) and maxWeightCommonRange (=0.9) can be used to denote the "common range of values (0.1-0.9), while the "leftovers" from 0-1 (0-0.1, and 0.9-1) are left for extreme values.

In some embodiments, minLogprobCommonRange and maxLogprobCommonRange are calculated from experimental results. For example, minLogprobCommonRange can be experimentally calculated as 2 and 12 (a range where the values for the rawWeight are commonly included).

The pseudo code can be used to measure and reward the "amount of surprise" that each n-gram (phrase) has in the context of a given document. That is, the more frequent an n-gram is in comparison with its expected frequency, the more weight it carries in that document.

This amount of surprise can more crudely be measured as actualFrequency/expectedFrequency. However, the ComputeCrossEntropy function provides a more sophisticated measurement that accounts for document length. The ComputeCrossEntropy function balances credit for very short and very long documents. For example, ComputeCrossEntropy function is configured to not give too much credit to very short documents nor steal to much credit from very long documents.

Method 200 includes an act of selecting a specified number of statistically significant textual phrases from within the document based on the computed cross-entropy values (act 205). For example, cross-entropy calculation module 103 can return a maximum number of top candidates based on computed cross-entropies. The number of top candidates can be all or some number less than all of the phrases contained in document 112, such as, for example, phrases 131, 132, 133, etc. Cross-entropy calculation module 103 can output the number of top candidates long with their corresponding cross-entropy values to phrase selector 106. For example, phrase 131 can be output with cross-entropy 151, phrase 132 can be output with cross-entropy 152, phrase 133 can be output with cross-entropy 153, etc. Phrase selector 106 can receive the number of top candidates long with their corresponding cross-entropy values from cross-entropy calculation module 103.

Phrase selector 106 can apply selection functions 158 to filter out one or more of the top candidates. Selections functions 158 can include weighting and/or threshold functions. Weighting functions can be used to rank phrase relevance (based on cross-entropy) in a key phrase data structure. Weighting functions can also provide a sufficiently detailed sort order with respect to both document similarity and phrase relevance. Threshold functions allow a key phrase data structure to be maintained in a lossy state. Threshold functions can be used to prune out phrases that have a cross-entropy under a specified cross-entropy threshold for a document.

Various different types of free parameters, such as, for example, cross-entropy/log probability, term frequency, document length, etc, can be used in selection functions. Functional forms for selection functions can be selected arbitrarily. For example, some possible types of weighting functions include:

| Functional form | Example |
| --- | --- |
| Linear | $f(.) = ax1 + bx2 + c$ |
| Polynomial | $f(.) = ax1^n + bx2^{n-1}$ |
| Ratio | $f(.) = ax1^n/bx2^m$ |
| Exponential | $2^{f(.)}, e^{f(.)}$ |

Similarly, threshold functions can be of the form: $f(.)<T$, or of the form $f(.)/g(.)<T\%$.

When both weighting and threshold functions are applied, it may be that phrase selector 106 outputs a set of phrases sorted from more relevant to less relevant, wherein the least relevant phrase retains a threshold relevance. For example, phrase selector 106 can output one or more phrases form document 112 such as, for example, phrases 132, 191, 192, etc.

Method 200 includes an act of populating a key phrase data structure with data representative of each of the selected specified number of statistically significant textual phrases (act 206). For example, phrase selector 106 can populated key phrase data structure 107 with phrases 132, 191, 192, etc. Phrases may or may not be stored along with a corresponding weight in a key phrase data structure. For a specified document, a key phrase data structure can be of the non-normalized format:

| Tags |
| --- |
| heart (w1), attack (w2), clogging (w3), PID:99 (w4) | or of the normalized format:

| Tag | Weight |
| --- | --- |
| heart | w1 |
| attack | w2 |
| clogging | w3 |
| PID:99 | w4 |

When a plurality of documents are processed (e.g., document 112, 122, etc), a document ID (e.g., document ID 111, 121, etc.) can travel along with each phrase to indicate the document where each phrase originated. In these embodiments, a key phrase data structure can be of the non-normalized format:

| Doc Id | Tags |
| --- | --- |
| 218 | heart (w1), attack (w2), clogging (w3), PID:99 (w4) | or of the normalized format:

| Doc Id | Tag | Weight |
| --- | --- | --- |
| 218 | heart | w1 |
| 218 | attack | w2 |
| 218 | clogging | w3 |
| 218 | PID:99 | w4 |

Figure 3:
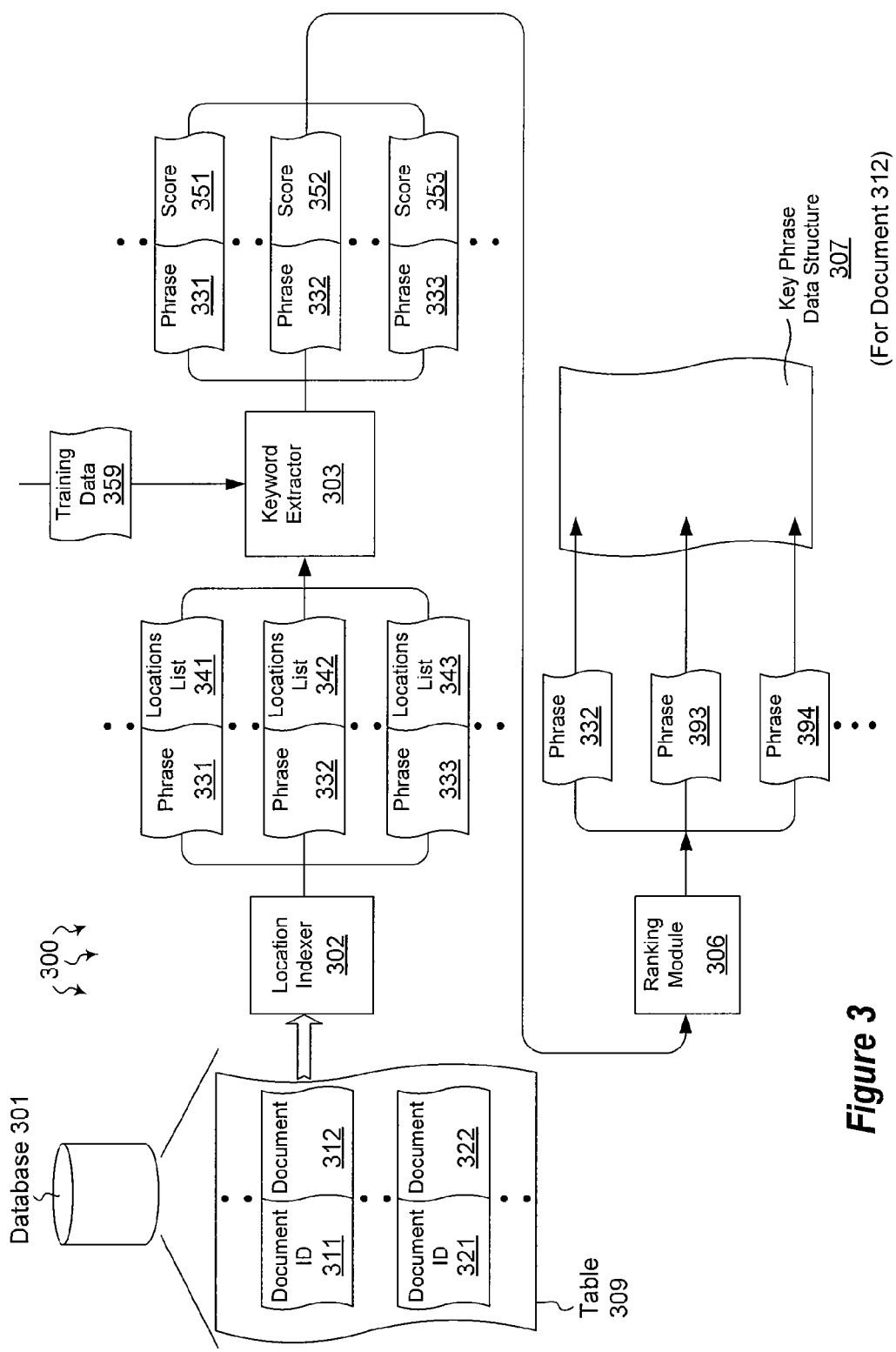
FIG. 3 illustrates an example computer architecture that facilitates identifying key phrases within documents.

FIG. 3 illustrates an example computer architecture 300 that facilitates identifying key phrases within documents. Referring to FIG. 3, computer architecture 300 includes database 301, location indexer 302, keyword extractor 303, ranking module 306, and key phrase data structure 307. Each of the depicted computer systems is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Database 301 can be virtually any type of database (e.g., a Structured Query Language ("SQL") database or other relational database). As depicted, database 301 can contain one or more tables including table 309. Each table in database 301 can include one or more rows and one or more columns used to organize data, such as, for example, documents. For example, table 309 includes a plurality of documents including documents 312 and 322. Each document can be identified by a corresponding document ID. For example, document ID 311 can identify document 312, document ID 321 can identify document 322, etc.

Location indexer 302 is configured to identify one or more locations within a document where phrases are located.

Keyword extractor 303 is configured to score key phrases from a document based on a location list for the key phrases relative to the occurrence of phrases in a training data set. A training data set can be used at keyword extractor 303 to produce a model for a supported language. In some embodiments, a phrase is used as a query term submitted to a search engine. Web pages returned in the search results from the query term are used as training data for the phrase. Training for a language can occur in accordance with the following pseudo code (where an ngram represents a phrase):

```
store = InitializeModel(language)
// set of documents and associated keyphrases
trainingSet = empty Dictionary<document,Set<ngram>>
foreach (language in SetOfLanguagesWeSupport)
{
  foreach ((ngram, frequency) inTrainingLanguageModel(language))
  {
    // seeding the store with the language model frequencies
    store.Add(ngram, frequency)
  }
  // SelectSampleOf is selecting about 10000 ngrams from the language model to
issue queries for
  foreach (ngram in SelectSampleOf(source=TrainingLanguageModel(language)))
  {
    // we only need about 10000 training documents
    if (trainingSet.Lengh >=10000) break;
    // we only retain the top URL that matches our needs
    URL document = QuerySearchEngine(ngram);
    keyphrases = new Set<ngram>( );
```

```
    keyphrases.Add(ngram); // add the query as a keyphrase
    trainingSet.Insert(document, keyphrases)
  }
// parse the documents, add contained ngrams as keyphrases
foreach ((document, keyphrases) in trainingSet)
{
    foreach (ngram in document)
    {
        trainingSet[document].Add(ngram)
    }
}
// process the training set and build the KEX model
// this part is generic, can take as input any training set, regardless if it was produced
from querying search engine or is a manually tagged set of documents
    foreach ((document, keyphrases) in trainingSet)
    {
       foreach(keyphrase in keyphrases)
       {
         // it is a bit more complex than this, because we need to differentiate between
keyphrases that were used as queries vs the ones that were only found inside
the doc, etc.
           store.Update(document, keyphrase)
       }
    }
}
```

Keyword extractor 303 can run phrases and corresponding location lists against the model to extract phrases from a document. Keywords can be extracted in accordance with the following psuedocode (for a document in a given language and where an ngram represents a phrase):

```
store = ChooseModel(language)
features = empty collection
foreach( (ngram, locations) in DNI[document])
{
    if (ngram is not in store) continue;
    storedFeatures = store.GetFeatures(ngram);
    foreach (location in locations)
    {
        dynamicFeatures = ComputeFeatures(location, ngram);
        features.Insert(ngram, join(storedFeatures, dynamicFeatures));
    }
}
candidates = empty dictionary;
foreach(ngram in features.Keys)
{
    // this uses the predictive-model part of KEX trained model
    score = RelevanceScore(features[ngram]));
    if (score > threshold)
    {
        candidates.Add(ngram, score);
    }
}
``` return maxResults top-score candidates in score-decreasing order;

Ranking module 306 is configured to receive phrases and corresponding scores and rank the phrases in accordance with the scores. Ranking module 306 can store the ranked phrases in key phrase data structure 307.

Figure 4:
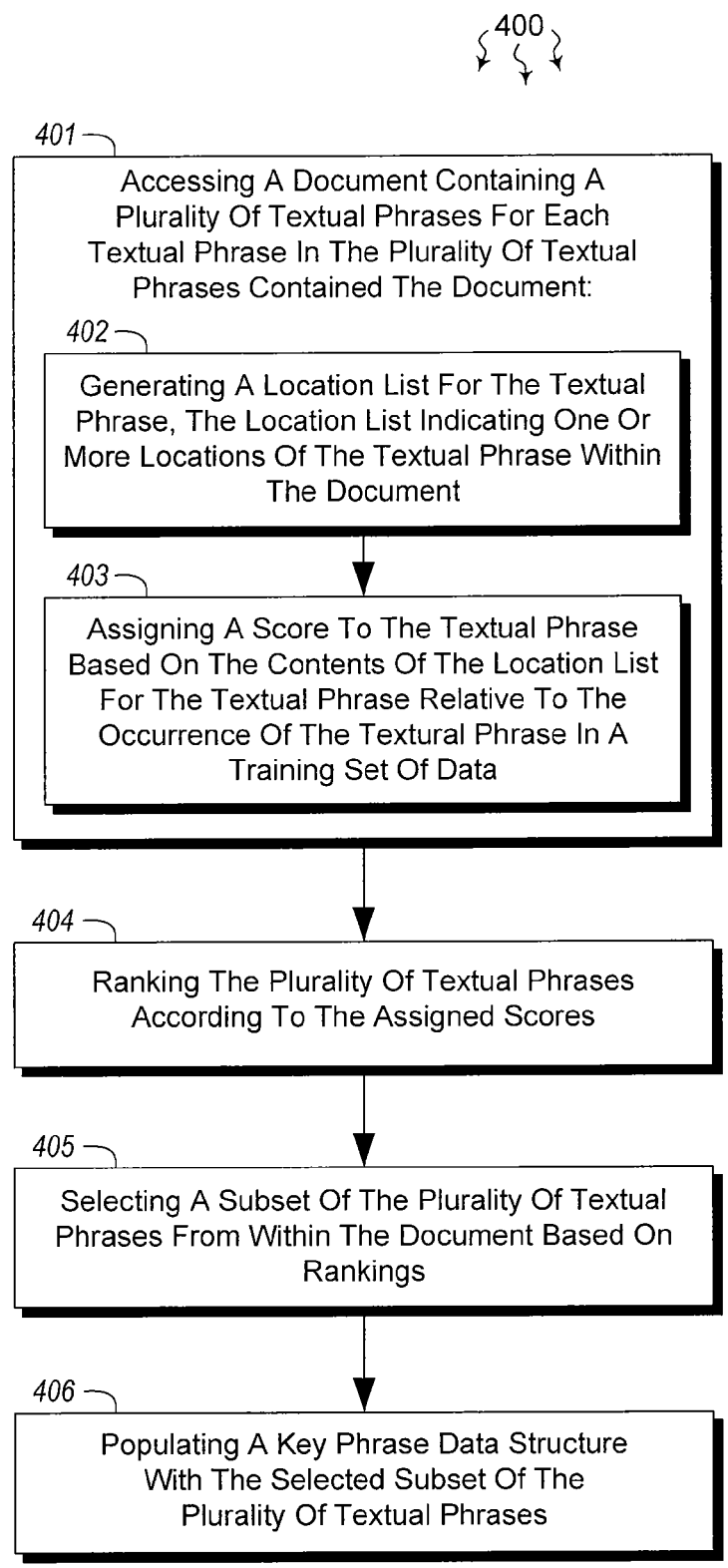
FIG. 4 illustrates a flow chart of an example method for identifying key phrases within documents.

FIG. 4 illustrates a flow chart of an example method 400 for identifying key phrases within documents. Method 400 will be described with respect to the components and data in computer architecture 300.

Method 400 includes an act of accessing a document containing a plurality of textual phrases (act 401). For example, location indexer 302 can access document 312. Document 312 can contain a plurality of textual phrases, such as, for example, phrases 331, 332, 333, etc.

For each textual phrase in the plurality of textual phrases contained in the document, method 400 includes an act of generating a location list for the textual phrase, the location list indicating one or more locations of the textual phrase within the document (act 402). For example, location indexer 302 can generate locations list 341 for phrase 331. Locations list 341 indicates one or more locations within document 312 where phrase 331 is found. Similarly, location indexer 302 can generate locations list 342 for phrase 332. Locations list 342 indicates one or more locations within document 312 where phrase 332 is found. Likewise, location indexer 302 can generate locations list 343 for phrase 333. Locations list 343 indicates one or more locations within document 312 where phrase 333 is found. Location lists for other phrases in document 312 can also be generated.

Location indexer 302 can send phrases and corresponding locations lists to keyword extractor 303. Keyword extractor 3030 can receive phrases and corresponding locations lists from location indexer 302.

For each textual phrase in the plurality of textual phrases contained the document, method 400 includes an act of assigning a score to the textual phrase based on the contents of the location list for the textual phrase relative to the occurrence of the textural phrase in a training set of data (act 403). For example, keyword extractor 303 can assign score 351 to phrase 331 based on the contents of locations list 341 relative to the occurrence of phrase 331 in training data 359. Similarly, keyword extractor 303 can assign score 352 to phrase 332 based on the contents of locations list 342 relative to the occurrence of phrase 332 in training data 359. Likewise, keyword extractor 303 can assign score 353 to phrase 333 based on the contents of locations list 343 relative to the occurrence of phrase 333 in training data 359. Scores for other phrases (e.g., phrases 393 and 394) can also be assigned.

Keyword extractor 303 can send phrases and corresponding scores to ranking module 306. Ranking module 306 can receive phrases and corresponding scores from keyword extractor 303.

Method 400 includes an act of ranking the plurality of textual phrases according to the assigned scores (act 404). For example, ranking module 306 can sort phrases 331, 332, 333, etc. according to assigned scores 351, 352, 353, etc. In some embodiments, ranking module 306 sorts phrases based on assigned scores such that phrases with similar relevancy to document 312 are grouped together.

Method 400 includes an act of selecting a subset of the plurality of textual phrases from within the document based on rankings (act 405). For example, ranking module 306 can select phrases 332, 393, 394, etc., from within document 312 based on rankings Method 400 includes an act of populating a key phrase data structure the selected subset of the plurality of textual phrases (act 406). For example, ranking module 306 can populate key phrase data structure 307 with phrases 332, 393, 394, etc.

When a plurality of documents are processed (e.g., documents 312, 322, etc.), a document ID (e.g., document ID 311, 321, etc.) can travel along with each phrase to indicate the document where each phrase originated.

The present invention extends to methods, systems, and computer program products for identifying key phrases within documents. Embodiments of the invention include using a tag index to determine what a document primarily relates to. For example, an integrated data flow and extract-transform-load pipeline, crawls, parses and word breaks large corpuses of documents in database tables. Documents can be broken into tuples. The tuples can be sent to a heuristically based algorithm that uses statistical language models and weight+cross-entropy threshold functions to summarize the document into its "top N" most statistically significant phrases. Accordingly, embodiments of the invention scale efficiently (e.g., linearly) and (potentially large numbers of) documents can be characterized by salient and relevant key phrases (tags).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for identifying key phrases within a document, the method comprising:
    an act of accessing a document;
    an act of calculating the frequency of occurrence of a plurality of different textual phrases within the document, each textual phrase including one or more individual words of a specified language, and outputting a list that contains at least some of the textual phrases together with the frequency of occurrence of output phrases within the document;
    an act of accessing a language model for the specified language, the language model defining expected frequencies of occurrence at least for individual words of the specified language;
    for each textual phrase in the output list, an act of determining the expected frequency of each such textual phrase by using the expected frequencies of at least some of the individual words of the language model to interpolate from the expected frequencies of said at least some individual words the expected frequency of each such textual phrase contained in said list;
    for each textual phrase in the output list, an act of computing a cross-entropy value computed from the frequency of occurrence of the textual phrase within the document and the determined expected frequency of occurrence of the textual phrase within the language model;
    an act of selecting a specified number of key textual phrases based on the computed cross-entropy values; and
    an act of populating a key phrase data structure with data representative of each of the selected specified number of key textual phrases.

2. The method as recited in claim 1, wherein the act of calculating the frequency of occurrence of a plurality of different textual phrases within the document comprises an act of calculating the frequency of occurrence of a single word of the specified language.

3. The method as recited in claim 1, wherein the act of calculating the frequency of occurrence of a plurality of different textual phrases within the document comprises an act of calculating the frequency of occurrence of a specified textual phrase that includes one or more words of the specified language.

4. The method as recited in claim 1, wherein the act of selecting a specified number of key textual phrases comprises an act of using a threshold functional to determine that one or more of the textural phrases contained in the output list are not statistically significant.

5. The method as recited in claim 4, wherein the threshold function considers for each of the textual phrases in the output list: the frequency of occurrence of the textual phrase within the document, an inverse document frequency for the textural phrase within a corpus of documents including the document, the language model, and the length of the document.

6. The method as recited in claim 1, wherein the act of selecting a specified number of key textual phrases comprises an act of using a weighting function to weight the statistical significance of the different textual phrases contained in the list relative to one another.

7. The method as recited in claim 6, wherein the weighting function considers for each of the textual phrases in said list: the frequency of occurrence of the textual phrase within the document, an inverse document frequency for the textual phrase within a corpus of documents including the document, the language model, and the length of the document.

8. The method as recited in claim 7, further comprising an act of approximating the inverse document frequency from the language model frequency for the textual phrases in the list.

9. The method as recited in claim 1, wherein the act of populating the key phrase data structure with data representative of each of the selected specified number of key textual phrases comprises an act of populating the key phrase data structure with an entry for each of the selected specified number of key textual phrases, each entry including a document identifier for the document, and a weight for the selected key textual phrase.

10. The method as recited in claim 1, further comprising prior to accessing a language model for the specified language:
    an act of entering one or more search terms into a search engine, the search terms related to textual phrases included in the document;
    an act of receiving results from the search engine, the results including documents that include the one or more search terms; and
    an act of generating the language model from the results returned from the search engine.

11. The method as recited in claim 1, further comprising prior to accessing a language model for the specified language:
    an act of querying a database for one or more database indices using user selected statements;

an act of receiving query results from the database, the query results including documents that include the one or more database indices; and an act of generating the language model from the query results.

12. A computer program product for use at a computer system, the computer program product for implementing a method for identifying key phrases within a document, the computer program product comprising one or more computer storage devices having stored thereon computer-executable instructions that, when executed at a processor, cause the computer system to perform the method, including the following:

access a document;

calculate the frequency of occurrence of a plurality of different textual phrases within the document, each textual phrase including one or more individual words of a specified language, and output a list that contains at least some of the textual phrases together with the frequency of occurrence of output phrases within the document;

access a language model for the specified language, the language model defining expected frequencies of occurrence at least for individual words of the specified language;

for each textual phrase in the output list, determine the expected frequency of each such textual phrase by using the expected frequencies of at least some of the individual words of the language model to interpolate from the expected frequencies of said at least some individual words the expected frequency of each such textual phrase contained in said list;

for each textual phrase in the output list compute a cross-entropy value computed from the frequency of occurrence of the textual phrase within the document and the determined expected frequency of occurrence of the textual phrase within the language model;

select a specified number of key textual phrases based on the computed cross-entropy values; and populate a key phrase data structure with data representative of each of the selected specified number of key textual phrases.

13. The computer program product as recited in claim 12, further comprising computer-executable instructions that, when executed, cause the computer system to:

enter one or more search terms into a search engine, the search terms related to textual phrases included in the document;

receive results from the search engine, the results including documents that include the one or more search terms; and generate the language model from the results returned from the search engine.

14. The computer program product as recited in claim 12, further comprising computer-executable instructions that, when executed, cause the computer system to:

query a database for one or more database indices using user select statements;

receive query results from the database, the query results including documents that include the one or more database indices; and generate the language model from the query results.

15. The computer program product as recited in claim 12, further comprising computer-executable instructions that, when executed, cause the computer system to use a weighting function to weight the statistically significance of the textual phrases in said list relative to one another.

16. The computer program product as recited in claim 15, wherein the weighting function considers for each textual phrases in the list: the frequency of occurrence of the textual phrase within the document, an inverse document frequency for the textual phrase within a corpus of documents including the document, the language model, and the length of the document.

* * * * *